United States Patent
Baelde et al.

(10) Patent No.: US 11,085,900 B2
(45) Date of Patent: Aug. 10, 2021

(54) MULTIELEMENT METHOD AND DEVICE FOR TESTING PARTS WITH ULTRASOUND

(71) Applicants: SAFRAN, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR)

(72) Inventors: Aurélien Baelde, Moissy-Cramayel (FR); Frédéric Jenson, Moissy-Cramayel (FR); Mathias Fink, Meudon (FR); Jérôme Laurent, Paris (FR); Claire Prada, Paris (FR)

(73) Assignees: SAFRAN, Paris (FR); CENTRE NATIONAL DE LA RECHERCHE SCIENTIFIQUE, Paris (FR); ECOLE SUPERIEURE DE PHYSIQUE ET DE CHIMIE, Paris (FR); INDUSTRIELLES DE LA VILLE DE PARIS, Paris (FR)

( * ) Notice: Subject to any disclaimer, the term of this patent is extended or adjusted under 35 U.S.C. 154(b) by 210 days.

(21) Appl. No.: 16/477,129

(22) PCT Filed: Jan. 23, 2018

(86) PCT No.: PCT/FR2018/050154
§ 371 (c)(1),
(2) Date: Jul. 10, 2019

(87) PCT Pub. No.: WO2018/138430
PCT Pub. Date: Aug. 2, 2018

(65) Prior Publication Data
US 2019/0360969 A1  Nov. 28, 2019

(30) Foreign Application Priority Data
Jan. 25, 2017 (FR) ..................... 1750585

(51) Int. Cl.
*G01N 29/22* (2006.01)
*G01N 29/24* (2006.01)
(Continued)

(52) U.S. Cl.
CPC .......... *G01N 29/043* (2013.01); *G01N 29/11* (2013.01); *G01N 29/221* (2013.01);
(Continued)

(58) Field of Classification Search
CPC .... G01N 29/043; G01N 29/32; G01N 29/221; G01N 29/11
(Continued)

(56) References Cited

U.S. PATENT DOCUMENTS 6,424,597 B1 * 7/2002 Bolomey ............. G01N 29/262
367/128
7,703,327 B2 * 4/2010 Georgeson ........... G01N 29/265
73/624

(Continued)

FOREIGN PATENT DOCUMENTS

CN  104280455 A  1/2015
EP  2952890 A2 * 9/2015 ............. G01N 29/06
(Continued)

OTHER PUBLICATIONS

International Search Report dated Mar. 29, 2018, issued in corresponding International Application No. PCT/FR2018/050154, filed Jan. 23, 2018, 3 pages.
(Continued)

*Primary Examiner* — Jacques M Saint Surin
(74) *Attorney, Agent, or Firm* — Christensen O'Connor Johnson Kindness PLLC (57) ABSTRACT

A method for nondestructively testing a part comprising an elongate microstructure is disclosed. The method comprises:
(Continued)

moving a linear transducer to a plurality of positions located facing a surface of the part, the linear transducer comprising a plurality of transducer elements that are aligned along a main direction; emitting a plurality of elementary ultrasonic beams, each of the plurality of elementary ultrasonic beams being emitted by each of the plurality of transducer elements in the direction of the surface; measuring a plurality of echo signals and a plurality of structural noises, each of the plurality of echo signals and each of the plurality of structural noises being measured by each of the plurality of transducer elements, each of the echo signals resulting from the backscatter of the elementary ultrasonic beams by a defect under the surface of the part, and each of the structural noises resulting from the backscatter of the elementary ultrasonic beams by the elongate microstructure; and determining a direction of elongation of the elongate microstructure when an amplitude of one among the plurality of measured structural noises is minimal in the plurality of positions. Furthermore, a non-destructive testing system for implementing the testing method is disclosed.

11 Claims, 6 Drawing Sheets

(51) Int. Cl.
G01N 29/265 (2006.01)
G01N 29/32 (2006.01)
G01N 29/48 (2006.01)
G01N 29/04 (2006.01)
G01N 29/11 (2006.01)

(52) U.S. Cl.
CPC ....... *G01N 29/225* (2013.01); *G01N 29/2437* (2013.01); *G01N 29/265* (2013.01); *G01N 29/32* (2013.01); *G01N 29/48* (2013.01); G01N 2291/015 (2013.01); G01N 2291/0234 (2013.01); G01N 2291/0289 (2013.01); G01N 2291/044 (2013.01); G01N 2291/101 (2013.01); G01N 2291/269 (2013.01)

(58) Field of Classification Search
USPC ......................................................... 73/602
See application file for complete search history.

(56) References Cited

U.S. PATENT DOCUMENTS

| | | | |
|---|---|---|---|
| 9,250,213 B1* | 2/2016 | Bossi | G01N 29/2418 |
| 9,488,573 B2 | 11/2016 | Edwards et al. | |
| 9,541,529 B2* | 1/2017 | Taglione | G01B 17/06 |
| 2014/0360289 A1* | 12/2014 | Georgeson | G01D 11/30 73/866.5 |
| 2021/0025855 A1* | 1/2021 | Baelde | G01N 29/262 |

FOREIGN PATENT DOCUMENTS

| | | | | |
|---|---|---|---|---|
| JP | 2015102405 | * | 6/2015 | ............ G01N 29/04 |
| WO | 2005/068995 A1 | | 7/2005 | |

OTHER PUBLICATIONS

Written Opinion of the International Searching Authority dated Mar. 29, 2018, issued in corresponding International Application No. PCT/FR2018/050154, filed Jan. 23, 2018, 8 pages.

Lobkis, O.I., et al., "Ultrasonic backscattering in polycrystals with elongated single phase and duplex microstructures," Ultrasonics 52(6):694-705, Jan. 1, 2012.

Thompson, R.B., et al., "Scattering of elastic waves in simple and complex polycrystals," Wave Motion 45(5):655-674, Apr. 1, 2008.

Written Opinion of the International Searching Authority dated Mar. 29, 2018, issued in corresponding International Application No. PCT/FR2018/050154, filed Jan. 23, 2018, 7 pages.

International Preliminary Report on Patentabillity dated Jul. 30, 2019, issued in corresponding International Application No. PCT/FR2018/050154, filed Jan. 23, 2018, 1 page.

* cited by examiner

MULTIELEMENT METHOD AND DEVICE FOR TESTING PARTS WITH ULTRASOUND

BACKGROUND OF THE INVENTION

The present invention relates to the general field of ultrasound transducers with multiple elements. In particular, the present invention applies to the non-destructive testing of parts comprising an elongate microstructure.

In the field of aeronautics, it is important to test all forged parts intended to be mounted in an aircraft. These parts are constituted of a material, for example titanium or a titanium alloy, comprising a crystalline structure and a microstructure. By definition, the crystalline structure of a part defines the structure of this part at a scale of around one tenth of a nanometre. The microstructure of a part defines the structure of this part at a scale of between one nanometre and one centimetre.

The crystalline structure of a part is tested using methods based on the diffraction of electromagnetic waves, for example the diffraction of X-rays. The microstructure of a part is tested using methods based on the reflection, on the diffusion, and/or on the backscattering of acoustic waves, for example, ultrasound.

Thus, methods of testing with ultrasound, intended to detect defects in a part are known. A defect can comprise, for example, laminations located between two layers forming the part, or also surface or volume discontinuities of said part. These methods consist of producing an ultrasound beam in the direction of a part to be tested, and analysing the signals reflected, diffused and backscattered by the defects located in this part.

Known methods for testing with ultrasound use a plurality of ultrasound transducers, configured to detect defects located at different depths of a part. The document of F. J. Margetan, J. Umbach, R. Roberts et al., "Inspection Development for Titanium Forgings", NTIS, 2007 thus proposes several types of ultrasound transducers of annular or sectorial geometry, which can be deposited on the surface of the part to be tested.

Document WO 2005/06895 describes a method and an appliance for examining the material inside an object by using the reflection or the diffraction of ultrasound.

Document U.S. Pat. No. 9,488,573 B2 describes a system for imaging an object using acousto-electromagnetic waves to study the physical properties of an object.

Document CN104280455 A describes a method for detecting defects in a part by using the diffusion of ultrasound.

However, these methods and these devices do not make it possible to detect an elongate microstructure located in a part to be tested.

Indeed, a part to be tested can comprise one or more elongate microstructures. This is the case, in particular, for parts made from a titanium or titanium alloy cylindrical billet. During the production of these parts, for example during a forging, one or more elongate microstructures are formed in these parts.

Yet, a disadvantage of a part comprising an elongate microstructure is that, during a testing of this part with an ultrasound beam, the backscatter of the ultrasound beam with this elongate microstructure produces a noise, called structural noise. This structural noise interferes with signals coming from the reflection, from the diffusion and/or of the backscatter of the ultrasound beam by the defects located in the part, and masks some of the signals measured during a testing of the part.

This disadvantage is all the more notable when the part to be tested comprises a complex shape or an internal anisotropic structure. It is particularly the case of axisymmetric-shaped parts, or parts made of titanium-forged metal, or titanium alloy materials.

Surprisingly, the inventors have shown that the amplitude of the structural noise depends on the relative position and the relative orientation of the ultrasound transducer used to test the part.

Moreover, the inventors have shown that the geometry of known ultrasound transducers does not make it possible to precisely detect the presence of an elongate microstructure located in a part to be tested.

AIM AND SUMMARY OF THE INVENTION

To overcome the abovementioned disadvantages, an aim of the invention is to provide a method for ultrasonically testing a part to determine a direction of elongation of an elongate microstructure located in a part.

Correlatively, another aim of the invention is to propose a device for ultrasonically testing a part, said device being configured to precisely detect and localise defects and elongate microstructures being located in a part.

In the present description and the appended claims, the expression "position" is used to simultaneously mean the spatial localisation and the orientation of an element in the space. In particular, a person skilled in the art will understand that the position of an element in the space can be defined using six degrees of freedom (X, Y, $\psi$, $\theta$, $\varphi$), the three coordinates (X, Y, Z) designate the spatial localisation of this element in Cartesian coordinates in an orthonormal coordinate system (X, Y, Z) and the three angles ($\psi$, $\theta$, $\varphi$) designate the orientation of this element in angular coordinates.

An aim of the invention is thus to provide a method for non-destructively testing a part comprising an elongate microstructure, said method being characterised in that it comprises the following steps:

moving a linear transducer in a plurality of positions located facing a surface of said part, said linear transducer comprising a plurality of transducer elements aligned along a main direction of said linear transducer;

emitting a plurality of elementary ultrasound beams, each of said plurality of elementary ultrasound beams being emitted by each of said plurality of transducer elements in the direction of said surface;

measuring a plurality of echo signals and a plurality of structural noises, each of said plurality of echo signals and each of said plurality of structural noises being measured by each of said plurality of transducer elements, each of said echo signals resulting from the backscatter of elementary ultrasound beams by a defect under the surface of the part, and each of said structural noises resulting from the backscatter of elementary ultrasound beams by said elongate microstructure;

determining a direction of elongation of the elongate microstructure when an amplitude of one from among a plurality of structural noises measured is minimal according to said plurality of positions.

Advantageously, this testing method makes it possible to precisely detect and localise an elongate microstructure located in a part.

Advantageously, this testing device makes it possible to test a part by minimising the structural noise generated by the backscatter of ultrasound beams with an elongate microstructure in a part.

Advantageously, this testing method does not require, before the implementation thereof, knowing the shape of the part.

Advantageously, this testing method is simple to implement, effective and economical.

In a specific embodiment of the invention, said plurality of elementary ultrasound beams emitted in each of the plurality of positions is localised to form a focal region.

In a specific embodiment of the invention, said direction of elongation of the elongate microstructure is determined along a direction parallel to said main direction.

Correlatively, an aim of the invention is to provide a system for non-destructively testing a part comprising an elongate microstructure, said system being characterised in that it comprises:

a linear transducer, said linear transducer comprising a plurality of transducer elements aligned along a main direction of said linear transducer, each transducer element of said plurality of transducer elements being capable of emitting an ultrasound beam;

a testing device comprising:
Displacement means of the linear transducer in a plurality of positions located facing a surface of said part;
emission means of a plurality of elementary ultrasound beams, each of said plurality of elementary ultrasound beams being emitted by each of said plurality of transducer elements in the direction of said surface; and
measuring means of a plurality of echo signals and a plurality of structural noises, each of said plurality of echo signals and each of said plurality of structural noises being measured by each of said plurality of transducer elements, each of said echo signals resulting from the backscatter of elementary ultrasound beams by a defect under the surface of the part, and each of said structural noises resulting from the backscatter of elementary ultrasound beams by said elongate microstructure;
means for determining a direction of elongation of the elongate microstructure when an amplitude of one from among the plurality of structural noises measured is minimal according to said plurality of positions.

Advantageously, this testing system makes it possible to effectively and quickly test a part, said part comprising defects and elongate microstructures.

In a specific embodiment of the invention, said plurality of transducer elements has a substantially rectangular shape comprising a large dimension and a small dimension, said transducer elements being arranged contiguously against one another along the large dimension.

In a specific embodiment of the invention, said emission means comprise focalisation means to focalise said plurality of elementary ultrasound beams emitted in each of the plurality of position to form a focal region.

In a specific embodiment of the invention, each of said plurality of transducer elements comprises a prefocalisation lens arranged along the large dimension.

In a specific embodiment of the invention, said displacement means are configured to move said linear transducer in translation along three orthogonal axes and in rotation about three orthogonal axes.

In a specific embodiment of the invention, the emission frequency of each of said plurality of transducer elements is greater than or equal to 1 MHz and less than or equal to 20 MHz.

In a specific embodiment of the invention, the number of transducer elements is selected from: 16, 64, 96 or 128.

In a specific embodiment of the invention, the large dimension and the small dimension of each of said plurality of transducer elements are equal to A mm and to B mm, respectively.

BRIEF DESCRIPTION OF THE INVENTION

Below in the description, longitudinal, transversal and vertical orientations will be adopted by convention and in a non-limiting manner, in reference to the trihedron (X, Y, Z) represented in the figures. The vertical direction is used as a geometric reference with no relation to the direction of terrestrial gravity.

The invention and the technical characteristics thereof will be best understood upon reading the following description, accompanied by several figures representing.

Naturally, to satisfy specific needs, a person skilled in the art can apply modifications in the following description. Although it refers to different embodiments, the present invention is not limited to these specific embodiments, and any specific modifications to the field of application of the present invention can be considered as clear for a person skilled in the corresponding art.

DETAILED DESCRIPTION OF AN EMBODIMENT

Below in the description, elements having a design, or identical, similar or comparable functions will be designated by the same reference.

FIGS. 1a, 1b, 2a and 2b represent schematic views of a method for non-destructively testing a part P using a linear transducer TT according to an embodiment of the invention. In the examples represented, the part P comprises an elongate microstructure M and a defect Df which is located under a surface S of said part P. Furthermore, the part P is a titanium-forged billet, of cylindrical shape, which comprises an internal anisotropic structure leading to an elongate microstructure M along a direction D.

In a non-limiting manner, the part P can be any type of part, shape and composition. For example, the part P can be a metal part, a composite material part comprising metal fibres, or also a part comprising a single-directional reinforcement oriented along a direction. According to other examples, the part P can be an axisymmetrically-shaped part, a solid of revolution, or also a symmetrically-shaped part.

Figure 1A:
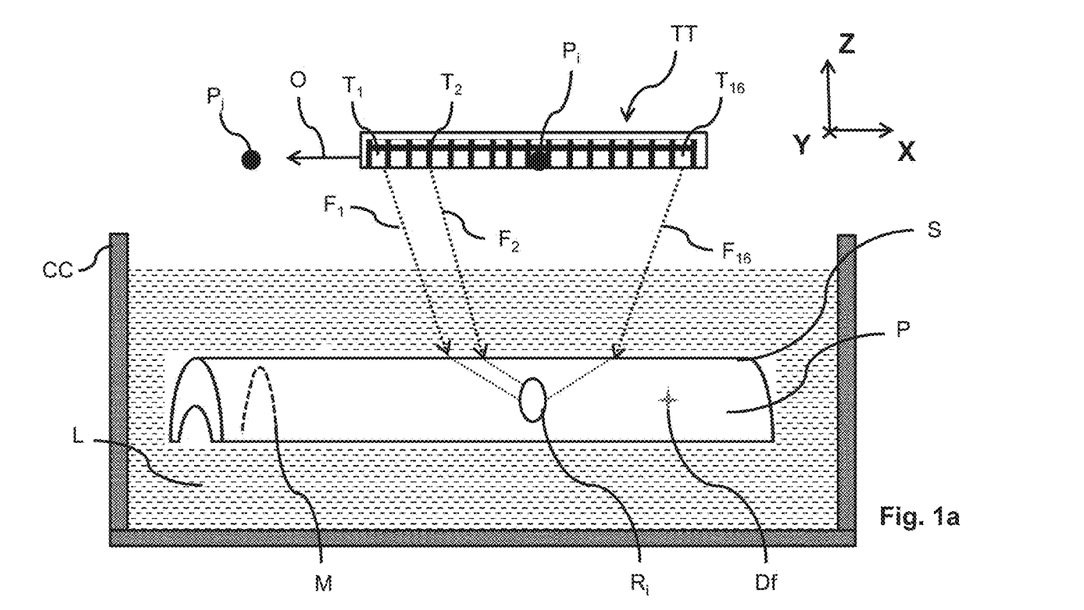
FIGS. 1a and 1b, respectively, several schematic profile views of a method for non-destructively testing a part according to an embodiment of the invention.
Figure 1B:
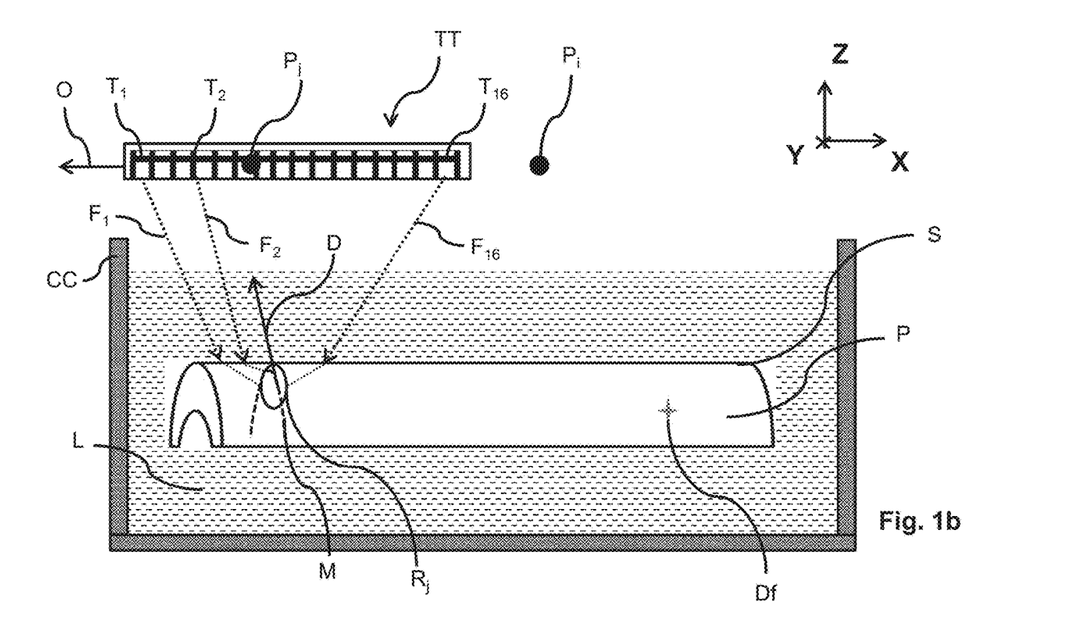

In FIGS. 1a and 1b, the part P is immersed in a liquid L, for example water contained in a tank CC. This configuration makes it possible to implement a method for ultrasonically testing the part P in immersion, using a linear transducer TT positioned at a distance from the part P.

In a variant, a testing method according to another embodiment of the invention can be applied in the absence of liquid L. To implement a method for ultrasonically testing the part P without immersing, a linear transducer TT can be directly deposited on a surface S of the part P.

In a variant, a linear transducer TT can be deposited on a surface S of the part P via a relay, for example a thermoplastic polymer or a transparent polymer, such as Plexiglas. A coupler, for example a composite gel or a lubricating oil, can also be placed between the linear transducer TT and the surface S of the part P to facilitate the movement of the linear transducer TT between two positions.

In a variant, a linear transducer TT can be placed and moved at a distance from a surface S of the part P, without using liquid L. A testing of the part P can, in particular, be carried out in air, without using any coupler.

According to an embodiment of the invention, the linear transducer TT is an acoustic transducer comprising a plurality of transducer elements $\{T_1, T_2, \ldots, T_n\}$. The linear transducer TT comprises a whole number n of transducer elements.

According to an embodiment of the invention, the number n of transducer elements is selected from among: 16, 64, 96 or 128. In a non-limiting manner, the figures illustrate a linear transducer TT example comprising 16 transducer elements, that is to define n as being equal to 16.

The transducer elements $\{T_1, T_2, \ldots T_n\}$ are arranged along a main direction O of the linear transducer TT. The direction of the main direction O defines the orientation direction of said linear transducer TT in the reference frame (X, Y, Z).

According to an embodiment of the invention, the linear transducer TT is adapted to be moved in translation about three first orthogonal axes. For example, said three first orthogonal axes can correspond to the direction of the reference frame (X, Y, Z). Furthermore, the linear transducer TT is adapted to be moved in rotation about three other orthogonal axes. For example, and in a non-limiting manner, said three other orthogonal axes are parallel to said three first orthogonal axes.

According to an embodiment of the invention, the linear transducer TT can be moved in translation along the longitudinal direction X, the transversal direction Y and/or the vertical direction Z. Furthermore, the linear transducer TT can be moved in rotation about a rolling axis $A\psi$, about a pitch axis $A\theta$, and/or about a yaw axis $A\varphi$ which could be parallel to the direction Z. In the figures, the rolling axis $A\psi$ is identical to the longitudinal direction X, the pitch axis $A\theta$ is identical to the transversal direction Y, and the yaw axis $A\varphi$ is identical to the vertical direction Z.

According to an embodiment of the invention, each of said transducer elements $\{T_1, T_2, \ldots, T_n\}$ comprises a piezoelectric element, for example a piezoelectric resonator, which is placed inside or on one of the surfaces of the linear transducer TT.

Each of the transducer elements $\{T_1, T_2, \ldots, T_n\}$ is capable of vibrating and of emitting an acoustic wave, in particular an ultrasound beam, when said piezoelectric element is subjected to an electrical impulse. Thus, the linear transducer TT is configured to generate ultrasound beams from electrically excitable transducer elements, and independently from one another. The elementary ultrasound beams can comprise flat waves, spherical waves, or also any type of waves adapted to testing a part with ultrasound.

According to an embodiment of the invention, each of said transducer elements $\{T_1, T_2, \ldots, T_n\}$ is configured to emit an elementary ultrasound beam in the direction of a surface S of a part P. To each transducer element, thus corresponds the emission of an elementary ultrasound beam. To the transducer element $T_1$, corresponds the emission of an elementary ultrasound beam $F_1$, to the transducer element $T_2$, corresponds the emission of an elementary ultrasound beam $F_2$; and subsequently thus to the emission of an elementary beam $F_{16}$ by a last transducer element $T_{16}$.

According to an embodiment of the invention, the frequency of emitting elementary ultrasound beams $\{F_1, F_2, \ldots, F_n\}$ can be selected from a range of between 20 kHz and 20 MHz. In particular, the frequency of emitting elementary ultrasound beams $\{F_1, F_2, \ldots, F_n\}$ can be selected as being greater than or equal to 1 MHz and less than or equal to 20 MHz.

According to an embodiment of the invention, the frequency of emitting elementary ultrasound beams $\{F_1, F_2, \ldots, F_n\}$ of each of the plurality of transducer elements $\{T_1, T_2, \ldots, T_n\}$ is selected from a range making it possible to have a sufficient resolution of the signals measured by these.

According to an embodiment of the invention, emitting elementary beams $\{F_1, F_2, \ldots, F_n\}$ by transducer elements $\{T_1, T_2, \ldots, T_n\}$ can be produced successively or simultaneously.

According to an embodiment of the invention, the elementary ultrasound beams can be focalised using the application of one delay law or several delay laws. This delay law, or these delay laws, make it possible to direct said elementary ultrasound beams $\{F_1, F_2, \ldots, F_n\}$ specifically in the part P.

In particular, a dynamic shaping of the ultrasound beams can be carried out by applying delays to the electrical signals used to excite each transducer element. Selecting adapted delays makes it possible to thus modify the characteristics of the ultrasound beams emitted, in particular in the direction thereof or the orientation thereof.

In FIG. 1a, a linear transducer TT is placed in a position $P_1$. The position $P_i$ is a position selected from among a plurality of positions $\{P_1, P_2, \ldots, P_m\}$ located facing a surface S of the part and in which the linear transducer TT can be moved.

In this position $P_i$, the position of the linear transducer TT is defined by six coordinates $(X_i, Y_i, Z_i, \psi_i, \theta_i, \varphi_i)$, the three coordinates $X_i, Y_i$ and $Z_i$ localising the spatial position $P_i$ of the linear transducer TT in the space defined by the three directions of the orthonormal coordinate system (X, Y, Z), and the three angular coordinates $\psi_i, \theta_i$ and $\varphi_i$ localising the angular orientation of the linear transducer TT with respect to three orthogonal directions, possibly parallel to the directions of said orthonormal coordinate system (X, Y, Z).

In FIG. 1b, the linear transducer TT is moved into another position $P_j$, different from the position $P_i$. It will be understood that the linear transducer TT can be moved in a number m of position from among the plurality of positions $\{P_1, P_2, \ldots P_m\}$. According to the applications made of an embodiment of the present invention, the number m of positions can be selected between 1 and 10000, and is preferably equal to 100. For example, the linear transducer TT can be moved in rotation over an interval of 180°. The precision obtained from a measurement taken over this interval will therefore be equal to 180° divided by the value of m.

According to an embodiment of the invention, the transducer elements $\{T_1, T_2, \ldots, T_n\}$ are configured to be simultaneously emitters and receivers of signals.

According to an embodiment of the invention, each of the transducer elements $\{T_1, T_2, \ldots, T_n\}$ is configured to emit an elementary beam and receive an echo signal or a structural noise. Several linear transducers can be used simultaneously. Furthermore, the transducer elements of at least one linear transducer TT can be used as emitters, while transducer elements of at least one other linear transducer can be used to measure echo signals or structural noises.

In a variant, different configurations can be used for implementing an embodiment of the invention: a transmission configuration for which an emitter transducer and a receiver transducer are placed on either side of the part P to be tested; a tandem mode configuration for which an emitter transducer and a receiver transducer are placed one in front of the other, or also a configuration for which an emitter linear transducer and a receiver linear transducer are arranged side-to-side and facing a surface S of the part P.

Thus, the transducer elements can measure, in a position selected from among a plurality of positions $\{P_1, P_2, \ldots, P_m\}$, a given echo signal from among a plurality of echo signals $\{E_1, E_2, E_m\}$, and/or a structural noise from among a plurality of structural noises $\{B_1, B_2, \ldots, B_m\}$. The echo signals $\{E_1, E_2, \ldots, E_n\}$ measured define signatures of a defect Df met by the elementary ultrasound beams $\{F_1, F_2, \ldots, F_n\}$.

According to an embodiment of the invention, the plurality of elementary ultrasound beams is focalised to form a focal region. In FIG. 1a, the linear transducer TT is placed in the position $P_i$, and the elementary ultrasound beams emitted $\{F_1, F_2, \ldots, F_n\}$ are focalised to form a focal region R. In FIG. 1b, the linear transducer TT is moved into the position $P_j$, and the elementary ultrasound beams emitted $\{F_1, F_2, \ldots, F_n\}$ are focalised to form a focal region $R_j$.

According to an embodiment of the invention, the position of each focal region can be modified by focalising each elementary beam in a focalisation position, and according to a selected orientation. To do this, a specific focalisation of the elementary ultrasound beams $\{F_1, F_2, \ldots, F_n\}$ can be obtained by subjecting each transducer element of the linear transducer TT to a delayed electrical signal with respect to the other piezoelectric elements.

According to an embodiment of the invention, the focalisation of each elementary ultrasound beam can be modified by modifying the delay law applied to each of the transducer elements.

Thus, the application of different delay laws to the electrical signals applied to the transducer elements $\{T_1, T_2, \ldots, T_n\}$ makes it possible to test the part P in depth. This dynamic shaping of the ultrasound beam makes it possible to modify the characteristics of the ultrasound beam emitted by each transducer element, and therefore to specifically achieve the focalisation of the beam in a focal region $R_i$, corresponding to the position $P_i$ of the linear transducer TT.

By moving the linear transducer TT from among the plurality of positions $\{P_1, P_2, \ldots, P_m\}$, it is thus possible to form a plurality of focal regions $\{R_1, R_2, \ldots, R_m\}$ inside which the presence of an elongate microstructure M can be determined, or also the presence of a defect Df of the part P.

Figure 2A:
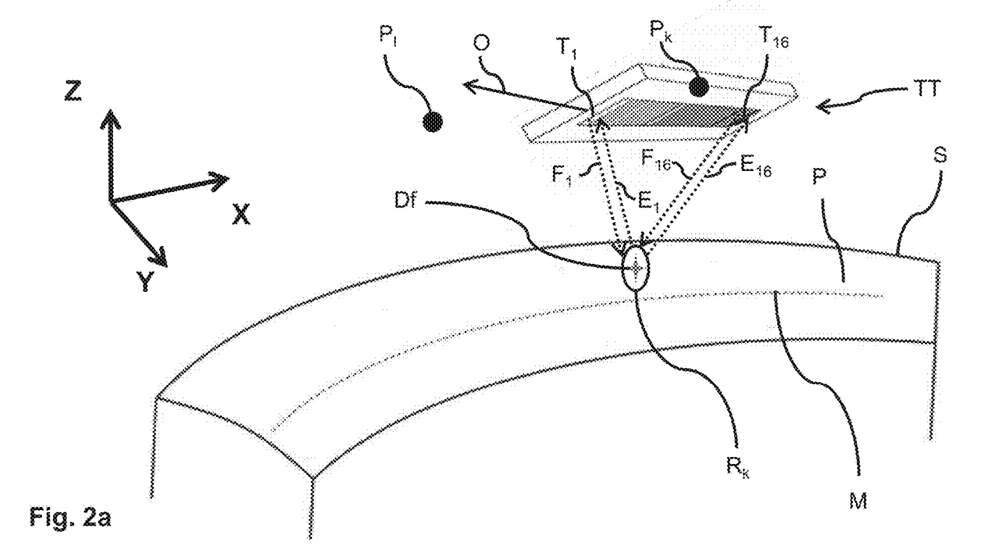
FIGS. 2a and 2b, respectively, several schematic perspective views of a method for non-destructively testing a part according to an embodiment of the invention.

In FIG. 2a, a linear transducer TT comprising n transducer elements $\{T_1, T_2, \ldots T_n\}$, for example 16 transducer elements, is moved into a position $P_k$. The elementary ultrasound beams $\{F_1, F_2, \ldots F_n\}$ form a focal region $R_k$ which comprises a defect Df located under the surface S of the part P.

According to an embodiment of the invention, each of the transducer elements $\{T_1, T_2, \ldots, T_n\}$ is configured to receive and measure an echo signal resulting from the backscatter of an elementary ultrasound beam by a defect Df located under a surface S of the part P. For example, according to the emission of an elementary ultrasound beam $F_1$, the transducer element $T_1$ measures an echo signal $E_1$ resulting from the backscatter of said elementary ultrasound beam $F_1$ with the defect Df. Likewise, according to the emission of an elementary ultrasound beam $F_{16}$ such as illustrated, the transducer element $T_{16}$ measures an echo signal $E_{16}$ resulting from the backscatter of $F_{16}$ with the defect Df.

Figure 2B:
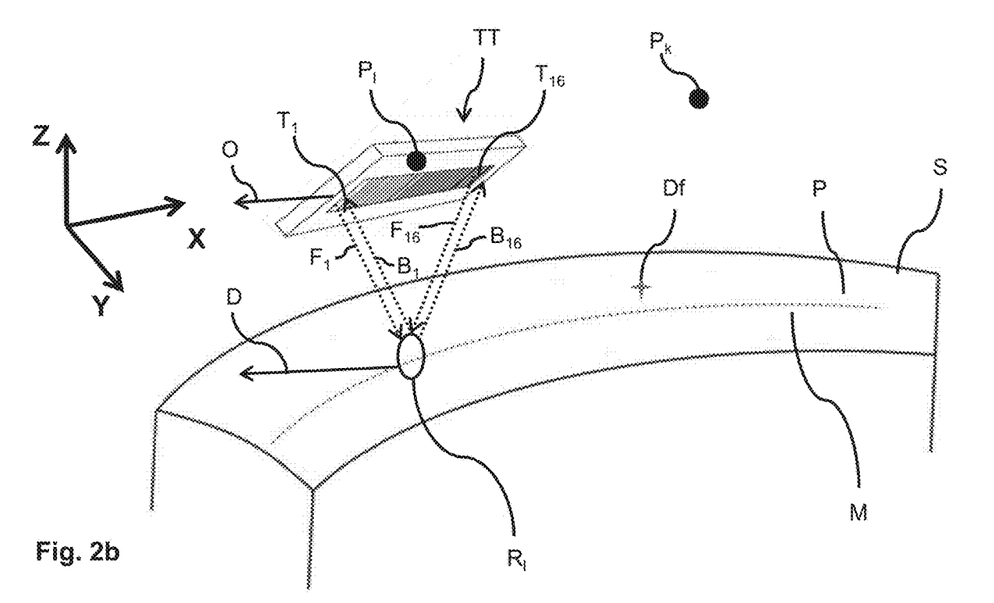

In FIG. 2b, the linear transducer TT is moved into a position $P_j$. The elementary ultrasound beams $\{F_1, F_2, \ldots, F_n\}$ form a focal region $R_j$ which comprises a portion of the elongate microstructure M located under the surface S of the part P.

According to an embodiment of the invention, each of the transducer elements $\{T_1, T_2, \ldots, T_n\}$ is configured to receive and measure a structural noise resulting from the backscatter of an elementary ultrasound beam by an elongate microstructure M located under the surface S of the part P. Successively to the emission of an elementary ultrasound beam $F_1$, the transducer element $T_1$ measures a structural noise $B_1$ resulting from the backscatter of said elementary ultrasound beam $F_1$ with the elongate microstructure M. Likewise, according to the emission of an elementary ultrasound beam $F_{16}$ such as illustrated, the transducer element $T_{16}$ measures a structural noise $B_{16}$ resulting from the backscatter of $F_{16}$ with the elongate microstructure M.

Figure 3:
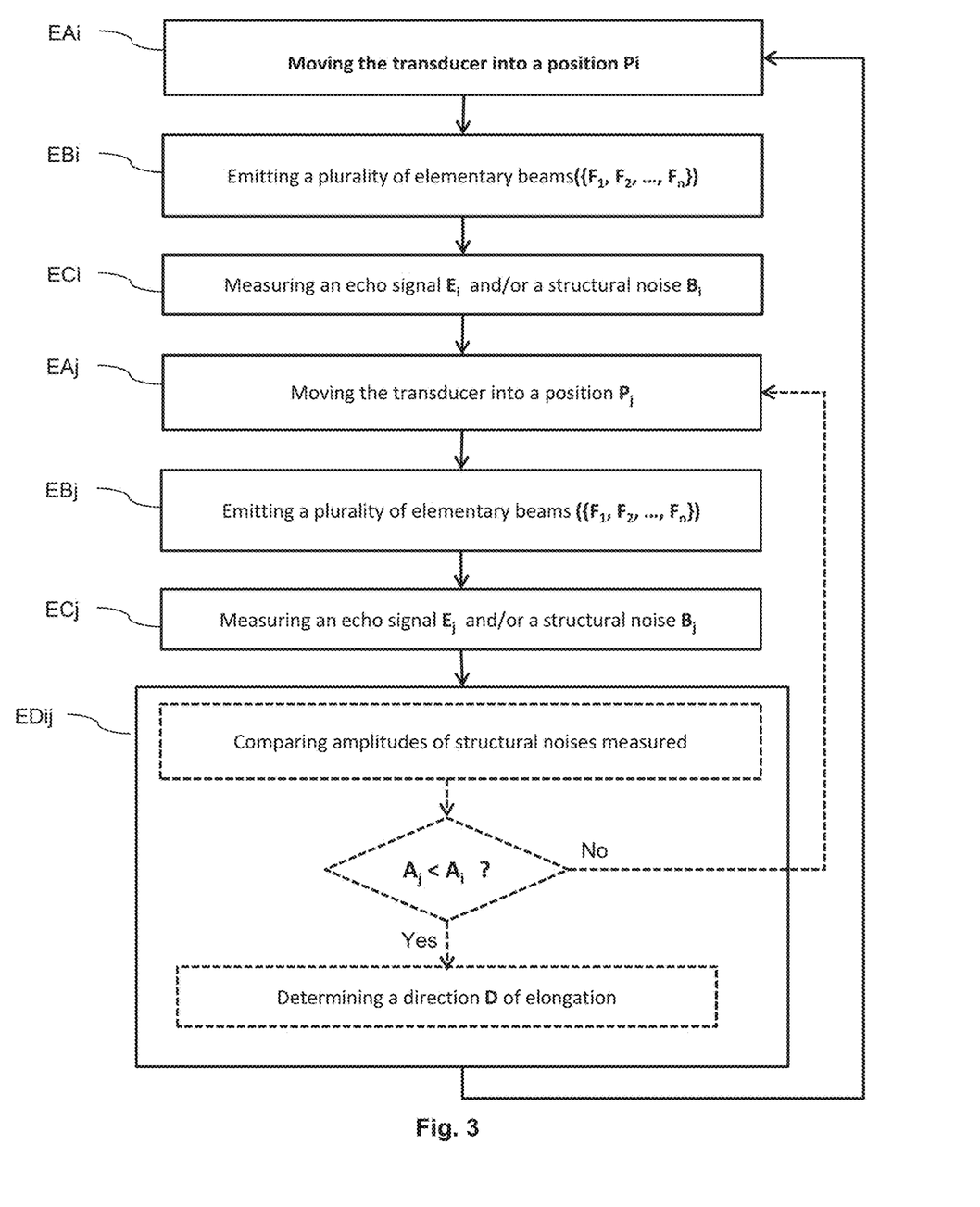
FIG. 3, in the form of a chart, an example of steps of a method for non-destructively testing a part according to an embodiment of the invention.

In reference to FIG. 3, here the steps of a method for non-destructively testing a part P are described, comprising an elongate microstructure M according to an embodiment of the invention.

Said testing method comprises a step EAi, said step of moving into a position $P_i$ of coordinates $(X_1, Y_i, \psi_i, \theta_i, \varphi_i)$ selected from among the plurality of positions $\{P_1, P_2, \ldots, P_m\}$ where the linear transducer TT is moved.

When the linear transducer TT is moved into the position $P_i$, the testing method implements a step EBi, said step of emitting in the position $P_i$, during which each of the transducer elements $\{T_1, T_2, \ldots, T_n\}$ emits an elementary ultrasound beam in the direction of the surface S.

Successively to step EBi, the testing method implements a step ECi, said step of measuring in the position $P_i$, during which each of the transducer elements $\{T_1, T_2, \ldots, T_n\}$ measures an echo signal $E_i$ and/or a structural noise $B_i$.

Successively to step ECi, the testing method implements a step EAj, said step of moving into the position $P_j$, during which the transducer TT is moved from the position $P_i$ to the position $P_j$, of coordinates $(X_j, Y_j, \psi_j, \theta_j, \varphi_j)$. This position $P_j$ is selected from among the plurality of positions $\{P_1, P_2, \ldots, P_m\}$, and differs from the position $P_i$, in that at least one of the coordinates $(X_j, Y_j, Z_j, \psi_j, \theta_j, \varphi_j)$ of the position $P_j$ differs from one of the coordinates $(X_i, Y_i, Z_i, \psi_i, \theta_i, \varphi_i)$ of the position $P_i$. For example, step EAj can consist of moving the linear transducer TT along the direction X with respect to the position $P_i$. In a variant, said step EAj can consist of rotating the linear transducer TT by an angle ψ, θ or φ with respect to the orientation of the linear transducer TT in the position $P_i$.

When the linear transducer TT is moved into the position $P_j$, the testing method implements a step EBj, called step of emitting in the position $P_j$, during which each of said plurality of transducer elements $\{T_1, T_2, \ldots, T_n\}$ again emits an elementary ultrasound beam in the direction of the surface S.

Successively to step EBj, the testing method implements a step ECj, called step of measuring in the position $P_j$, during which each of said plurality of transducer elements $\{T_1, T_2, \ldots, T_n\}$ measures an echo signal $E_j$ and/or a structural noise Bj.

At the end of step ECj, the testing method has thus made it possible to measure an echo signal $E_i$ and/or a structural noise $B_i$ in the position $P_i$ and an echo signal $E_j$ and/or a structural noise $B_j$ in the position $P_j$.

Successively in step ECj, the testing method implements a step EDij, called comparison step between the position $P_i$ and the position $P_j$, to compare the amplitudes $B_i$ and $B_j$ of the structural noises measured respectively during steps ECi and ECj.

If the amplitude of the structural noise $B_j$ is greater than the amplitude of the structural noise $B_i$, the testing method again implements, successively, steps EAj, EBj, ECj and EDij.

If the amplitude of the structural noise $B_j$ is strictly less than the amplitude of the structural noise $B_i$, the testing method determines, in the position of the linear transducer TT, a direction D of elongation of the elongate microstructure M. Thus, by analysing the signals received by the linear transducer TT, the testing method makes it possible to determine a direction D of elongation of an elongate microstructure M in a part P, by identifying the positions for which the amplitude of the structural noise is minimal.

According to an embodiment of the invention, the plurality of elementary ultrasound beams $\{F_1, F_2, \ldots, F_n\}$ emitted in each of the plurality of positions $\{P_1, P_2, \ldots, P_m\}$ is focalised to form a focal region $\{R_1, R_2, \ldots, R_m\}$.

Surprisingly, the inventors have shown that the structural noise backscattered by an elongate microstructure M in a part P is anisotropic. It results that the amplitude of the structural noise signals measured by a linear transducer TT by moving in a plane orthogonal to the direction of the elongate microstructure M is a lot more fluctuating than the amplitude of structural noise signals measured by this same linear transducer TT by moving in a plane containing said direction of the elongate microstructure M.

Thus, the best approximation of a direction D of elongation of the elongate microstructure M is determined as being parallel to the main direction O of the linear transducer TT when the amplitude of the structural noise measured is minimal over all of the positions $\{P_1, P_2, \ldots, P_m\}$ in which said linear transducer TT is moved. According to an embodiment of the invention, the main direction O can be parallel to the longitudinal direction X of a reference frame (X, Y, Z) of which the origin is located on the linear transducer TT.

FIGS. 4a, 4b, 5a and 5b illustrate the implementation of step EDij to determine a direction D of elongation of an elongate microstructure M in the part P. This direction D of elongation is determined when an amplitude of one from among the plurality of structural noises $\{B_1, B_2, \ldots, B_m\}$ measured is minimal in a position from among the plurality of positions $\{P_1, P_2, \ldots P_m\}$. Said direction D of elongation can be determined approximatively, or also iteratively, by implementing steps EAj, EBj, ECj and EDij as many times as desired by moving the linear transducer TT among the plurality of positions $\{P_1, P_2, \ldots, P_m\}$.

Figure 4A:
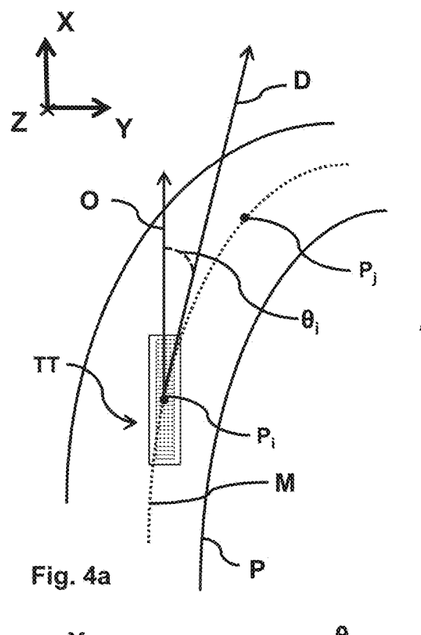
FIGS. 4a and 4b, respectively, a schematic top view of a method for non-destructively testing a part using a linear transducer moved into a first position and a time evolution of the amplitude of a structural noise measured by this linear transducer in this first position according to an embodiment of the invention.

FIG. 4a represents a linear transducer TT moved into a first position $P_i$, according to an embodiment of the invention. In particular, the linear transducer TT and the plurality of transducer elements $\{T_1, T_2, \ldots, T_n\}$ is moved into a plane parallel to the plane XY and passing through the first position P. This first position $P_i$ is located to the vertical of an elongate microstructure M in a part P. The main direction O of said linear transducer TT is not parallel to the direction D of elongation of the elongate microstructure M in the first position P. An angle $\theta_i$, defining the angle between the main direction O and the direction D of elongation in the first position $P_i$ is therefore non-zero.

Figure 4B:
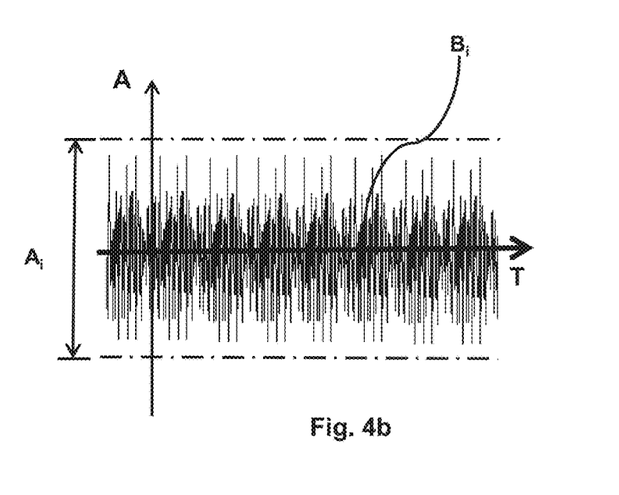

FIG. 4b represents the evolution of the amplitude A of a first structural noise $B_1$ over time T, said first structural noise $B_1$ being the sum of structural noises measured by each of the plurality of transducer elements $\{T_1, T_2, \ldots, T_n\}$ when the linear transducer TT is moved into said first position $P_i$. The amplitude of said first structural noise B; measured is equal to $A_i$.

Figure 5A:
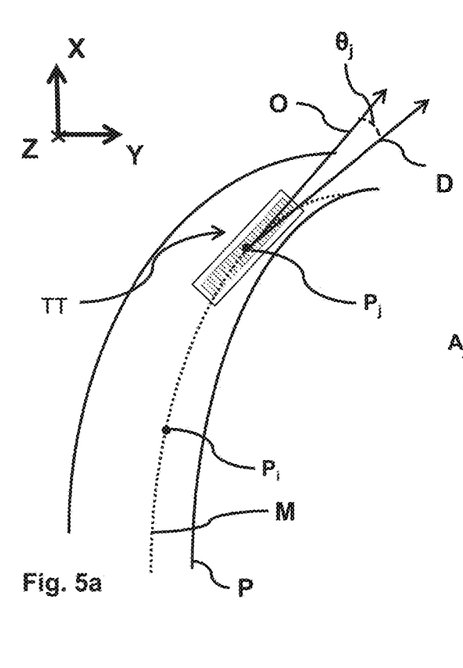
FIGS. 5a and 5b, respectively, a schematic top view of a method for non-destructively testing a part using a linear transducer moved into a second position and a time evolution of the amplitude of a structural noise measured by this linear transducer in this second position according to an embodiment of the invention.

In FIG. 5a, the linear transducer TT is moved into a second position $P_j$ according to an embodiment of the invention. In particular, the linear transducer TT is moved into a plane parallel to the plane XY and passing through the second position $P_j$. This second position $P_j$ is located at the vertical of an elongate microstructure M in a part P. In the position $P_j$, the main direction O of the linear transducer TT is not parallel to the direction D of elongation of the elongate microstructure M when said linear transducer TT was moved into the first position R. The angle $\theta_j$ defining the angle between said main direction O and said direction D of elongation in the second position $P_j$ is non-zero, and this angle $\theta_j$ is less than the angle $\theta_i$.

Consequently, the main direction O of said linear transducer TT has a greater parallelism with the direction D of elongation of the elongate microstructure M in the second position $P_j$ than in the first position P.

Figure 5B:
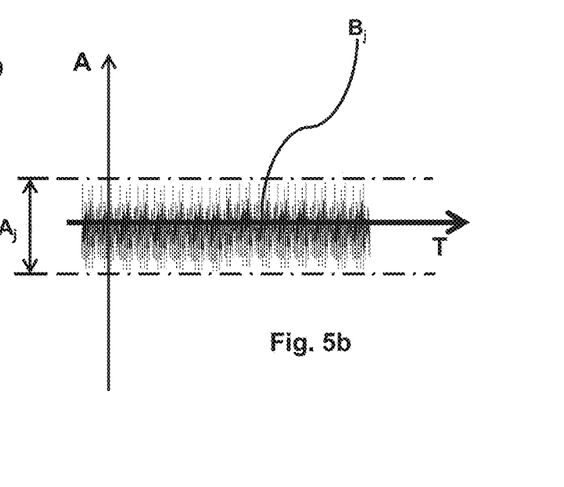

FIG. 5b represents the evolution of the amplitude A of a second structural noise $B_j$ over time T, said first structural noise $B_j$ being the sum of structural noises measured by each of the plurality of transducer elements $\{T_1, T_2, \ldots T_n\}$ when the linear transducer TT is moved into said second position $P_j$. The amplitude of said second structural noise $B_j$ measured is equal to $A_j$.

When step EDij is implemented, the testing method according to an embodiment of the invention compares the two amplitudes $A_i$ and $A_j$. By comparing with FIG. 4b, said amplitude $A_j$ is less than the amplitude $A_i$ of the first structural noise $B_i$ measured.

In the case where the amplitude $A_j$ of the structural noise $B_j$ is greater than or equal to the amplitude $A_i$ of the structural noise $B_i$, which corresponds to the situation represented in FIGS. 4a, 4b, 5a and 5b, the main direction O of the linear transducer TT moved into the second position $P_j$ has a smaller parallelism than when said linear transducer TT was moved into the first position $P_i$. In this case, the transducer is moved into a new position among the plurality of positions $\{P_1, P_2, \ldots, P_m\}$, by repeating successive steps EAj, EBj, ECj and EDij.

If the amplitude $A_j$ of the structural noise $B_j$ is less than the amplitude $A_i$ of the structural noise $B_i$, it results that the main direction O of the linear transducer TT in the second position $P_j$ has a greater parallelism than when said linear transducer TT was moved into the first position $P_i$. In this case, the main direction O of the linear transducer TT provides a good approximation of a direction D of elongation of the elongate microstructure M.

Based on the carrying out of step EDij, movements of the linear transducer TT to a position where the amplitude of one among the plurality of structural noises $\{B_1, B_2, \ldots, B_m\}$ measured is minimal, makes it possible to align the main direction O of said linear transducer TT with a direction D of elongation of the elongate microstructure M. Knowledge of the main direction O of said linear transducer TT thus makes it possible to deduce the direction D of elongation thereof of the elongate microstructure M.

According to an embodiment of the invention, the linear transducer TT is moved only in translation according to the positions selected from among the plurality of positions $\{P_1, P_2, \ldots, P_m\}$ to an optimal position where the amplitude of one from among the plurality of structural noises $\{B_1, B_2, \ldots B_m\}$ measured is minimal. The linear transducer TT is then moved only in rotation, for example over an interval of 180°, until the amplitude of the structural noise measured is minimal.

Figure 6A:
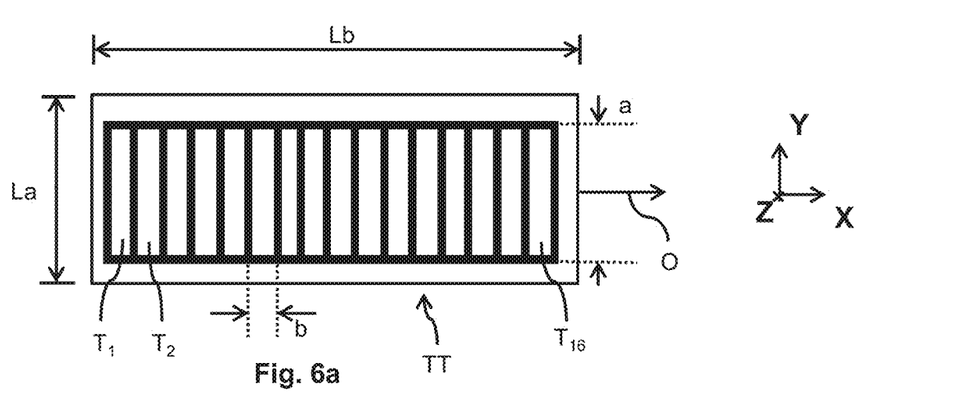
FIGS. 6a, 6b and 6c, respectively, a cross-sectional view in a plane XY, a cross-sectional view in a plane XZ and a cross-sectional view in a plane YZ of a linear transducer used to implement an embodiment of the invention.
Figure 6B:
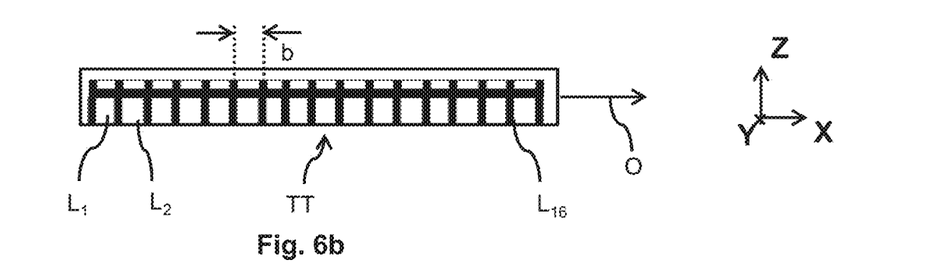
Figure 6C:
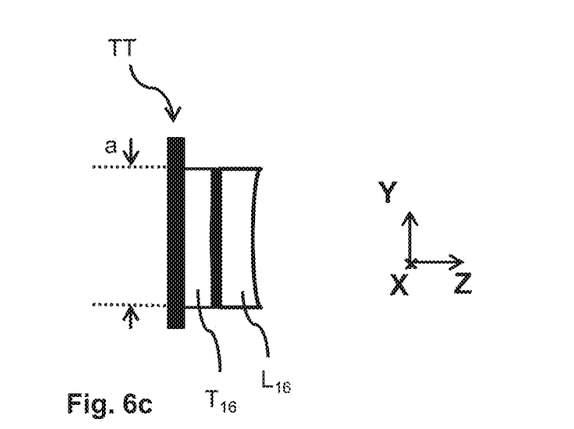

FIGS. 6a, 6b and 6c represent cross-sectional views of a linear transducer TT used to implement an embodiment of the invention.

FIG. 6a is a cross-sectional view of said linear transducer TT in a plane XY. This linear transducer TT can be used in a testing device to implement the invention, and comprises, for example, 16 transducer elements $\{T_1, T_2, \ldots, T_{16}\}$ arranged along the main direction O.

According to an embodiment of the invention, each of the transducer elements has a rectangular shape comprising a large dimension a and a small dimension b, said transducer elements being arranged contiguously against one another along the large dimension a.

In FIG. 6a, the large dimension a and the small dimension b are, respectively, the length and the width of each transducer element in the plane XY. The linear transducer TT, comprising 16 transducer elements $\{T_1, T_2, \ldots, T_{16}\}$, therefore also has a rectangular shape, with a length La and a width Lb. In particular, the length La is the length of the largest side of the linear transducer TT in the plane XY, and the width Lb is the length of the smallest side of the linear transducer TT in the plane XY.

According to an embodiment of the invention, the large dimension a and the small dimension b of each of said plurality of transducer elements $\{T_1, T_2, \ldots, T_n\}$ are equal to 10 mm and to 0.4 mm, respectively.

A non-rectangular device, for example a circular or annular device, or also a single-element device comprising one single transducer element, has no main direction. Such devices are therefore different from the case of a linear transducer TT having a rectangular shape is a main direction O. A non-rectangular or single-element device does not make it possible to determine the direction of an elongate microstructure M in a part P.

FIG. 6b is a cross-sectional view of the linear transducer TT in a plane XZ. FIG. 6c is a cross-sectional view of the linear transducer TT in a plane YZ, in which are only visible the transducer element $T_{16}$ and a prefocalisation lens $L_{16}$ arranged in contact with the transducer element $T_{16}$.

According to an embodiment of the invention, each of the transducer elements $\{T_1, T_2, \ldots, T_{16}\}$ comprises a prefocalisation lens arranged along a large dimension a. It will be understood, that a prefocalisation lens from among a plurality of prefocalisation lenses $\{L_1, L_2, \ldots, L_{16}\}$ is thus arranged under each transducer element from among the plurality of transducer elements $\{T_1, T_2, \ldots, T_{16}\}$.

According to an embodiment, each prefocalisation lens makes it possible to focalise an elementary ultrasound beam from among said plurality of elementary ultrasound beams $\{F_1, F_2, \ldots, F_n\}$ to form a focal region $\{R_1, R_2, \ldots, R_m\}$ located under a surface S of the part P.

Figure 7:
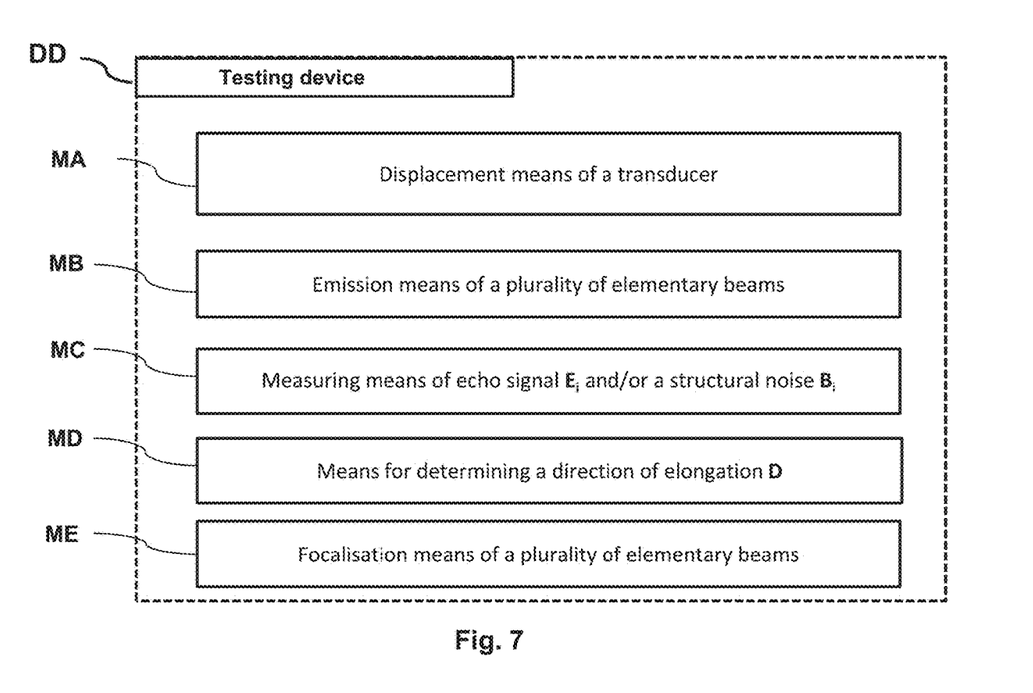
FIG. 7, in the form of a chart, an example of means used to implement a device for non-destructively testing a part according to an embodiment of the invention.

In reference to FIG. 7, the invention also aims for a device DD for non-destructively testing a part P comprising an elongate microstructure M.

According to an embodiment of the invention, the device DD comprises:

displacement means MA, comprising for example, a robotic arm or a mobile support on which is arranged a linear transducer TT, and configured to implement steps EAi and EAj;

emission means MB of a plurality of elementary ultrasound beams $\{F_1, F_2, \ldots, F_n\}$, comprising for example, transducer elements or piezoelectric sensors, and configured to implement steps EBi and EBj;

measuring means MC of an echo signal $E_i$ and/or a structural noise $B_i$, comprising for example, said transducer elements or said piezoelectric sensors of the emission means MB, and configured to implement steps ECi and ECj;

means MD for determining a direction D of elongation of an elongate microstructure M, comprising for example, an information processing system, a peripheral, a microcomputer, a workstation or also a mobile telecommunication terminal, and configured to implement step EDij.

According to an embodiment of the invention, the determination means MD are configured to process the signals detected by each of the transducer elements $\{T_1, T_2, \ldots, T_n\}$, and to compare these detected signals with other signals, or reference signals.

According to an embodiment of the invention, the device DD further comprises focalisation means ME, comprising for example, a plurality of prefocalisation lenses to focalise a plurality of elementary ultrasound beams $\{F_1, F_2, \ldots, F_n\}$. Said elementary ultrasound beams are emitted by the transducer elements $\{T_1, T_2, \ldots, T_n\}$ in each of the plurality of positions $\{P_1, P_2, P_m\}$.

According to an embodiment of the invention, said prefocalisation means ME are configured to form a focal region $\{R_1, R_2, \ldots, R_m\}$ under a surface S of the part P.

Figure 8:
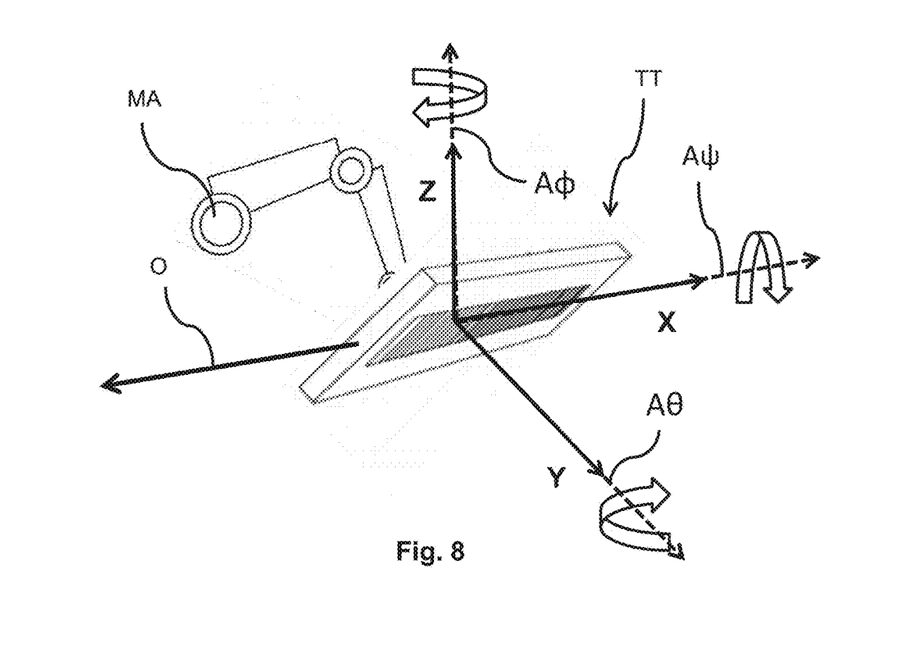
FIG. 8, a schematic perspective view of a linear transducer used to implement an embodiment of the invention.

FIG. 8 is a perspective view of a linear transducer TT used to implement an embodiment of the invention. Said linear transducer TT can be moved into the space and around the part P using displacement means MA, for example a mobile support or a robotic arm.

According to an embodiment of the invention, the displacement means MA are configured to move the linear transducer TT in translation along three orthogonal axes X, Y and Z and in rotation about three orthogonal axes $A\psi$, $A\theta$ and $A\varphi$. It will be understood, that the orthogonal axes X, Y and Z can correspond to the directions of a reference frame (X, Y, Z) of which the origin is located on the linear transducer TT.

According to an embodiment of the invention, the three orthogonal axes $A\psi$, $A\theta$ and $A\varphi$ are parallel to the three orthogonal axes X, Y and Z.

According to an embodiment of the invention, the displacement means MA can comprise means for coding in Cartesian coordinates, in polar coordinates and/or in spherical coordinates.

In a non-limiting manner, a person skilled in the art will understand, that the embodiments of the invention can also be applied in the medial field to test organs or tissues, for example soft tissues, which could be assimilated to a part P comprising an elongate microstructure M.

The invention claimed is:

1. A method for non-destructively testing a part comprising an elongate microstructure, said method comprising:
- moving a linear transducer in a plurality of positions located facing a surface of said part, said linear transducer comprising a plurality of transducer elements aligned along a main direction of said linear transducer;
- emitting a plurality of elementary ultrasound beams, each of said plurality of elementary ultrasound beams being emitted by each of said plurality of transducer elements in the direction of said surface;
- measuring a plurality of echo signals and a plurality of structural noises, each of said plurality of echo signals and each of said plurality of structural noises being measured by each of said plurality of transducer elements, each of said echo signals resulting from the backscatter of elementary ultrasound beams by a defect under the surface of the part, and each of said structural noises resulting from the backscatter of elementary ultrasound beams by said elongate microstructure;
- determining a direction of elongation of the elongate microstructure when an amplitude of one from among a plurality of structural noises measured is minimal according to said plurality of positions.

2. The testing method according to claim 1, wherein said plurality of elementary ultrasound beams emitted in each of the plurality of positions ($\{P_1, P_2, \ldots, P_m\}$) is focalized to form a focal region.

3. The testing method according to claim 1, wherein said direction of elongation of the elongate microstructure is determined along a direction parallel to said main direction.

4. A system for non-destructively testing a part comprising an elongate microstructure, said system comprising:
- a linear transducer, said linear transducer comprising a plurality of transducer elements aligned along a main direction of said linear transducer, each transducer element of said plurality of transducer elements being configured for emitting an ultrasound beam;
- a testing device comprising:
  - displacement means of the linear transducer in a plurality of positions located facing a surface of said part;
  - emission means of a plurality of elementary ultrasound beams, each of said plurality of elementary ultrasound beams being emitted by each of said plurality of transducer elements in the direction of said surface;
  - measuring means of a plurality of echo signals and a plurality of structural noises, each of said plurality of echo signals and each of said plurality of structural noises being measured by each of said plurality of transducer elements, each of said echo signals resulting from the backscatter of elementary ultrasound beams by a defect under the surface of the part, and each of said structural noises resulting from the backscatter of elementary ultrasound beams by said elongate microstructure; and
  - means for determining a direction of elongation of the elongate microstructure when an amplitude of one from among the plurality of structural noises measured is minimal according to said plurality of positions.

5. The testing system according to claim 4, wherein each of said plurality of transducer elements has a substantially rectangular shape comprising a large dimension and a small dimension, said transducer elements being arranged contiguously against one another along the large dimension.

6. The testing system according to claim 4, wherein said emission means comprise focalization means to focalize said plurality of elementary ultrasound beams emitted in each of the plurality of positions to form a focal region.

7. The testing system according to claim 6, wherein each of said plurality of transducer elements comprises a prefocalization lens arranged along the large dimension.

8. The testing system according to claim 4, wherein said movement means are configured to move said linear transducer in translation along three orthogonal axes and in rotation about three orthogonal axes.

9. The testing system according to claim 4, wherein the frequency of emitting each of said plurality of transducer elements is greater than or equal to 1 MHz and less than or equal to 20 MHz.

10. The testing system according to claim 4, wherein the number of transducer elements is selected from among: 16, 64, 96 or 128.

11. The testing system according to claim 4, wherein the large dimension and the small dimension of each of said plurality of transducer elements are equal to 10 mm and to 0.4 mm, respectively.

* * * * *

UNITED STATES PATENT AND TRADEMARK OFFICE
CERTIFICATE OF CORRECTION

Page 1 of 1

PATENT NO. : 11,085,900 B2
APPLICATION NO. : 16/477129
DATED : August 10, 2021
INVENTOR(S) : A. Baelde et al.

It is certified that error appears in the above-identified patent and that said Letters Patent is hereby corrected as shown below:

On the Title Page

| Column | Line | |
|---|---|---|
| 1/(73) Assignees | 5-6 | change "CHIMIE, Paris (FR); INDUSTRIELLES" to -- CHIMIE INDUSTRIELLES -- |

Signed and Sealed this
Third Day of May, 2022

Katherine Kelly Vidal
*Director of the United States Patent and Trademark Office*